United States Patent [19]
Phillips et al.

[11] Patent Number: 6,017,415
[45] Date of Patent: Jan. 25, 2000

[54] METHOD FOR CO-PULPING WASTE CELLULOSIC MATERIAL AND WOOD CHIPS

[75] Inventors: Richard B. Phillips, Cincinnati; Linda A. Beltz, Canal Winchester, both of Ohio; Craig Forehand, Neenah; Wayne Christopherson, Kaukauna, both of Wis.; James A. McCann, Walden; Thomas E. Amidon, Highland Mills, both of N.Y.; Jean J. Renard, Norristown, Pa.; Roger H. Purrington, Kents Hill, Me.

[73] Assignee: International Paper Company, Purchase, N.Y.

[21] Appl. No.: 08/924,360

[22] Filed: Sep. 5, 1997

[51] Int. Cl.[7] .................................................... D21B 1/08
[52] U.S. Cl. ................... 162/4; 162/8; 162/147; 162/189; 162/191
[58] Field of Search ........................... 162/4, 8, 76, 189, 162/191, 147, 149

[56] References Cited

U.S. PATENT DOCUMENTS

| | | | |
|---|---|---|---|
| 3,440,134 | 4/1969 | Murphy, Jr. | 162/8 |
| 3,925,150 | 12/1975 | Marsh | 162/4 |
| 4,000,063 | 12/1976 | Laakso | 209/233 |
| 4,188,259 | 2/1980 | Mamers et al. | 162/4 |
| 4,191,610 | 3/1980 | Prior | 162/147 |
| 4,435,249 | 3/1984 | Markham et al. | 162/24 |
| 4,810,328 | 3/1989 | Freis et al. | 162/60 |
| 5,032,224 | 7/1991 | Ahluwalia | 162/75 |
| 5,147,503 | 9/1992 | Nguyen | 162/7 |
| 5,587,202 | 12/1996 | Sandvick et al. | 427/155 |

FOREIGN PATENT DOCUMENTS

| | | |
|---|---|---|
| 1110411 | 10/1981 | Canada . |
| 94/12718 | 6/1994 | WIPO . |

*Primary Examiner*—Dean T. Nguyen
*Attorney, Agent, or Firm*—Ostrager Chong Flaherty & Onofrio, P.C.

[57] ABSTRACT

A method wherein waste cellulosic material is used as an alternative fiber source during chemical pulping to replace a fraction of the wood chips. The waste cellulosic material is fed to the digester along with wood chips. The waste cellulosic material need not be repulped or slurried prior to digestion. The wood chips may be any species of hardwood or softwood. Normal chemical pulping charges, temperatures and cooking times applied in the case of 100% wood chip pulping may be used for the co-pulping of waste cellulosic material and wood chips. Thereafter, the pulp is processed as usual for chemical pulping, including the steps of blowing the digester, washing and thickening the brown stock, and bleaching the brown stock under the normal conditions used for the component co-pulped with the waste cellulosic material. Further screening or cleaning steps may be required to remove debris from waste cellulosic material.

16 Claims, 7 Drawing Sheets

METHOD FOR CO-PULPING WASTE CELLULOSIC MATERIAL AND WOOD CHIPS

FIELD OF THE INVENTION

The invention relates to methods for recycling waste corrugated paperboard. In particular, the invention relates to a method of producing bleachable grade pulps using a mixture of recycled cellulosic materials and wood chips.

BACKGROUND OF THE INVENTION

Previous efforts to recycle cellulosic materials, such as waste corrugated materials, boxcuts (i.e., waste similar to cereal boxes or soda cases/cartons), old newspapers, have focused on various methods to treat the cellulosic material before it is reused by itself or mixed with virgin pulp. For example, U.S. Pat. No. 3,440,134 to Murphy discloses a method for producing an acceptable grade of paper utilizing waste corrugated cardboard and corrugated paper. The method of Murphy comprises the steps of comminuting waste corrugated material, forming a water slurry with said waste, adjusting the solids content of the waste in slurry form to approximately 20%, digesting the comminuted waste slurry with caustic soda in an amount consisting of 10% by weight of the waste, heating the slurry with direct steam to approximately 160° C. for about 3 hours, pulping the digested slurry at a temperature of approximately 35° C. for 3 to 5 minutes, increasing the solids content of the resulting pulp to approximately 30%, and bleaching the pulp as required to achieve a desired brightness.

U.S. Pat. No. 5,147,503 to Nguyen discloses a process and an apparatus for recycling waste cellulosic material including corrugated paperboard to produce a cellulosic fiber pulp. The process involves the steps of cooking the waste cellulosic material, for example, corrugated paperboard, in an aqueous alkaline cooking liquor to produce a brown stock pulp having a kappa number lower than that of the waste material. The recycled pulp can be employed as the sole pulp component of brown paper products, or can be bleached to provide a pulp for white products. The brown stock can be mixed with virgin pulp.

As disclosed in the Nguyen patent, paperboard is typically produced from virgin pulp. The production of virgin pulp involves reacting or cooking wood chips with an alkaline cooking liquor at an elevated temperature. Lignin is a component of the wood chips which is dissolved by the cooking liquor in the manufacture of cellulose pulp. The character of the pulp produced is dependent on the extent of lignin removal from the wood chips, and hence on the residual lignin content of the final pulp. The kappa number represents a measure of residual lignin content. Higher kappa numbers indicate higher residual lignin levels. The kappa number of a brown stock pulp obtained from cooking softwood in a kraft liquor is typically 50 to 100, and such a pulp is used for making linerboard of corrugated paperboard. The kappa number of a brown stock pulp obtained from cooking hardwood in a kraft liquor is typically 130 to 160, and such a pulp is used for making the corrugated medium of the corrugated paperboard. The kappa number of a hardwood brown stock pulp would need to be reduced to about 10 to 15, and that of a softwood brown stock pulp to about 25 to 35 to provide a pulp suitable for bleaching to produce white paper products. Corrugated paperboard waste comprising linerboard and corrugating medium has a kappa number of 80 to 120.

U.S. Pat. No. 4,191,610 to Prior discloses the manufacture of corrugated boxes from a corrugated medium consisting of virgin semichemical pulp, corrugated clippings, old corrugated boxes or mixed waste material using waste liquor.

U.S. Pat. No. 3,925,150 to Marsh discloses a method of recycling corrugated paperboard of the type comprising a fluted layer sandwiched between layers of linerboard. The fluted layer is usually made from relatively low grade and short-fibered pulp, such as neutral sulfite semichemical pulp and short-fibered kraft pulp. The liners are commonly made of a good grade of kraft pulp. When corrugated board is pulped for use as waste paper stock, the high-grade kraft constituents of the liners and the relatively lower-grade fiber constituents of the corrugating medium are thoroughly mixed, and the resulting furnish is no longer suitable as liner stock. The Marsh patent discloses a method for separating used corrugated board into two fractions, one being kraft fiber suitable for use as virgin kraft pulp and the other fraction containing the majority of the semichemical pulp and other short-fibered constituents of the corrugated medium.

Canadian Patent No. 1,110,411 discloses a method for recycling waste consisting of paperboard which has been previously impregnated with waxes or resins in a previous converting process, such as wet strength packaging or furniture component manufacture. To avoid the expense of using original kraft cooking liquor (white liquor) to digest the waste paperboard, Canadian Patent No. 1,110,411 proposes to use the effluent by-product of a prior pulping process, i.e., the weak black liquor from the kraft (sulfate) process for making pulp by cooking wood chips under heat and pressure in a solution of sodium hydroxide and sodium sulfide.

None of the aforementioned prior art discloses or suggests to co-pulp waste cellulosic material with wood chips

SUMMARY OF THE INVENTION

The present invention is a method for recycling cellulosic materials, such as waste corrugated materials, boxcuts and newspapers. In accordance with this method, the waste cellulosic material is used as an alternative fiber source during chemical pulping to replace a fraction of the wood chips. Reusing waste cellulosic materials such as corrugated cardboard and corrugated paper has the benefit of recycling this material and using less wood products in the production of acceptable grades of paper. Utilizing waste cellulosic material also helps minimize the impact of escalating prices and limited availability of wood chips.

In accordance with the method of the invention, the waste cellulosic material is shredded and then fed to the digester along with wood chips. The waste cellulosic material need not be repulped or slurried prior to digestion. The wood chips may be any species of hardwood or softwood. Alternatively, the waste cellulosic material can be co-pulped with non-wood fibrous material, e.g., bagasse. When corrugated material is used as the cellulosic material, normal chemical pulping charges, temperatures and cooking times applied in the case of 100% wood chip pulping can be used for co-pulping the corrugated material and wood chips. After the cooking operation, the pulp is processed as usual for chemical pulping, including the steps of blowing the digester, washing and thickening the brown stock, and bleaching the brown stock under the normal conditions used for the wood or non-wood component co-pulped with the waste cellulosic material. Further screening or cleaning steps may be required to remove debris from waste cellulosic material.

Co-pulping of wood chips and waste cellulosic material provides recycled fiber content in consumer products and enables the cost-effective use of scrap waste cellulosic mate-rial in bleachable grade pulps. Unexpectedly, co-pulping of waste cellulosic material with wood chips gave a higher pulp yield than that obtained using wood chips alone.

Co-pulping in accordance with the method of the invention provides the capability to vary pulp properties by varying the amount of waste cellulosic material used. Co-pulping of waste cellulosic material with wood chips can be accomplished using existing batch or continuous wood chip digesters using pulping conditions established for 100% wood chip pulping. This allows flexibility in the amount of waste cellulosic material combined with the wood chips and provides the critical process robustness essential for routine commercial use. Finally, the use of waste cellulosic material may provide a lower raw material cost than the cost of the wood chips which the waste cellulosic material replaces.

DETAILED DESCRIPTION OF THE PREFERRED EMBODIMENTS

Figure 1:
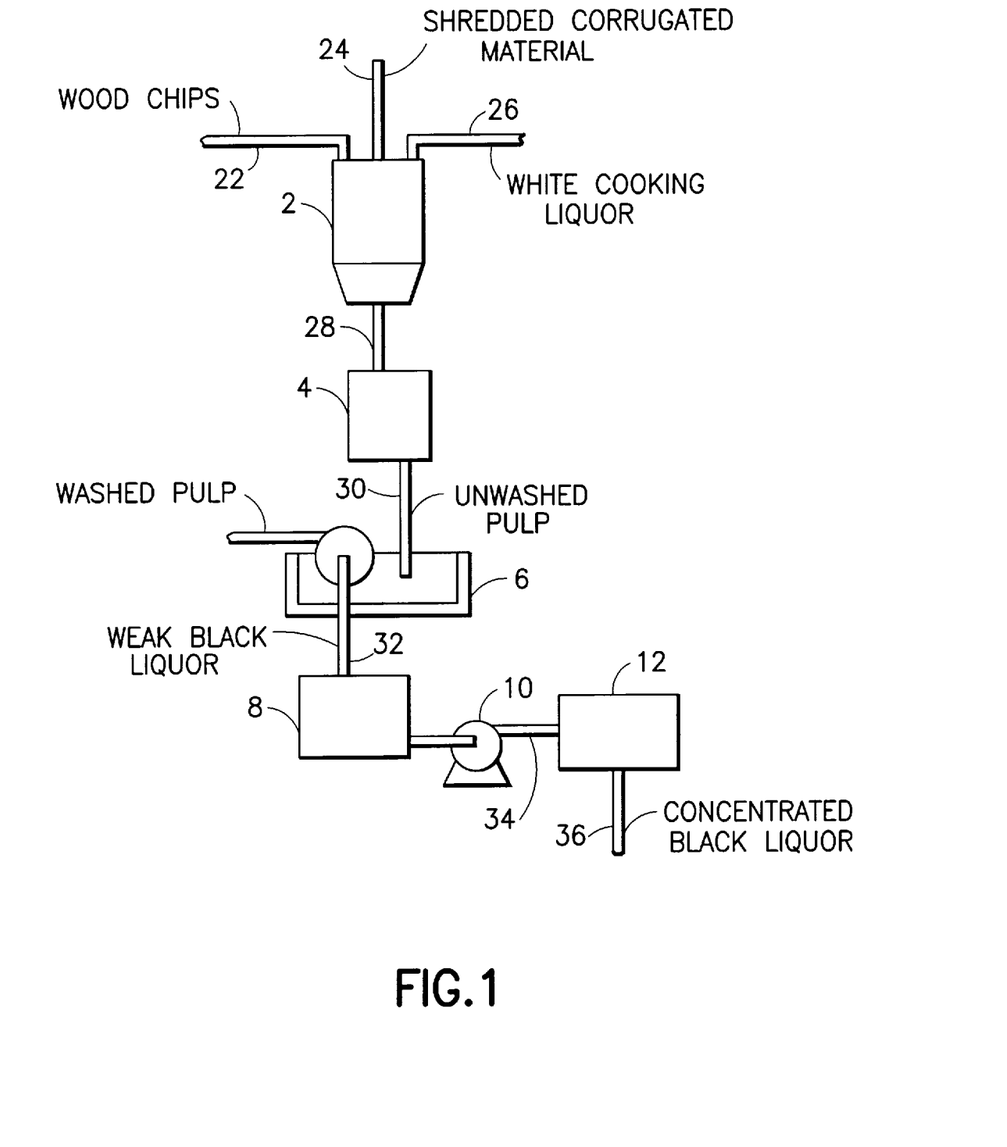
FIG. 1 is a schematic diagram showing the essential components of a conventional kraft pulp manufacturing system.

Referring to FIG. 1, the present invention is practiced using a conventional kraft pulp manufacturing system comprising a kraft pulp digester 2 into which wood chips are introduced via line 22, shredded waste cellulosic material is introduced via line 24 and white cooking liquor is introduced via line 26. The shredded waste cellulosic material may be fed to the digester dry or wet with water or other pulping chemicals (e.g., white liquor, black liquor, green liquor, alkaline sulfite liquor, sodium hydroxide solution, sodium sulfide solution, anthraquinone solution [soluble or dispersion] or any combination of these). The shredded waste cellulosic material can be wetted either prior to or while being fed to the digester 2, thereby increasing the amount of waste cellulosic material per volume for pulping.

In the case of corrugated waste material, the wetting process will decrease the consistency and flatten the fluting in the corrugated material. However, corrugated material will retain its shredded form and will not become a defibered slurry. Wetting, pre-steaming or steam packing of the digester will allow pulping of more corrugated material per volume than dry corrugated material without these treatments. Shredded corrugated material may be detrashed in a wet or dry state.

The waste cellulosic material content may vary from 1 to 99 wt. %, with the remainder being wood chips. The wood chips may be any species of hardwood or softwood. The waste cellulosic material can also be co-pulped with non-wood fibrous materials, e.g., bagasse. The digester feed material may be fed as is, exposed to pre-steaming before entering the digester or steam packed in the digester.

The digester may be operated in a continuous or batch mode. Inside the kraft pulp digester 2, the wood chips and shredded waste cellulosic material are cooked for a period of time under heat and pressure to separate the fibers to produce kraft pulp. Normal chemical pulping charges, temperatures and cooking times applied in the case of 100% wood chip pulping are used for the co-pulping of waste cellulosic material and wood chips. Modification of these conditions may be necessary with varying amounts and types of waste cellulosic material. In particular, as the weight percent of waste cellulosic material in the digester is increased, one or more of the following parameters can be decreased: cooking temperature, cook duration and amount of active chemical (e.g., sodium hydroxide) in the cooking liquor. At the end of the cook, the contents of the digester including pulp and spent cooking liquor (weak black liquor) are discharged through line 28 into a blow tank 4 for temporary retention.

From the blow tank 4 the pulp and black liquor are discharged as unwashed pulp through line 30 into a brown stock washer 6. The function of the brown stock washer 6 is to wash the spent chemicals and impurities out of the pulp, the resultant solution being called "weak black liquor". In a conventional kraft system there are usually a series of brown stock washers with the pulp going from a first washer (e.g., washer 6 indicated in FIG. 1) to successive washers. The pulp is washed in progressively cleaner water, with the wash water moving countercurrently against the progression of the pulp from washer to washer so that the cleanest pulp is washed with the cleanest water in the last washer and the dirtiest pulp is washed with the dirtiest water in the first washer. After washing, the brown stock may be thickened and bleached under the normal conditions used for the wood or non-wood component being co-pulped with the waste cellulosic material. Further screening or cleaning steps may be required to remove debris from the brown stock.

The weak black liquor from washer 6 passes through a conduit 32 into a weak black liquor storage tank 8. From the storage tank 8, the weak black liquor is transferred by a pump 10 through a line 34 into an evaporator 12, from which it emerges through line 36 as concentrated black liquor ready for burning to produce heat energy and recovered sodium chemicals for re-use as original cooking liquor.

The types of waste cellulosic material suitable to practice this invention include, but are not limited to, clean corrugated clippings, old corrugated containers or wax- or resin-treated corrugated material, as well as other cellulosic scrap paper (i.e. newspaper, wet-strength packaging, etc.). The waste cellulosic material may be in the form of clippings, scraps or pellets. Binders for pelletizing the waste cellulosic material include water, pulping liquor, black liquor (or spent liquor for processes other than kraft), green liquor, sodium hydroxide solution, anthraquinone solution, oxidized or partially oxidized white liquor or any combination of the above. Pelletizing will increase the corrugated material weight per volume. Pellets may have consistencies ranging from 40 to 95%.

The process of co-pulping waste cellulosic material and wood chips may be accomplished using a kraft pulping process or some other chemical pulping process, such as acid sulfite, neutral sulfite, alkaline sulfite, soda, kraft-polysulfide and any modification of these processes using pulping catalysts and additives such as anthraquinone and surfactant type digester aids.

EXPERIMENTAL DATA

Laboratory Co-Pulping of Corrugated Clippings and Southern Hardwood. In the first experiment, the feed to the digester consisted of 50% dry corrugated material (brown boxes) and 50% hardwood chips (ratio by oven dry weight). The dry corrugated material was shredded into 1.5-inch square clippings. The hardwood chips consisted of mixed species Southern hardwood chips screened to have a thickness of 2 to 6 mm. The pulping process was carried out in a laboratory digester. The corrugated material and hardwood chips were mixed in the digester basket. Kraft pulping was carried out at 16% active alkali on wood (as $Na_2O$), 28.9% sulfidity, 5:1 liquor-to-digester feed ratio, and a time/temperature profile of 60 minutes from 100° C. to 170° C. and 60 minutes at 170° C. After pulping, the basket was removed from the digester and the material in the basket was cooled and washed with tap water. The respective cooked corrugated material and hardwood chips were then separated, fiberized by mechanical means and processed separately to measure various data for the individual components of the cook. Measurement of data for the combined cook was done after the separated pulps were recombined according to their individual yields.

Figure 2:
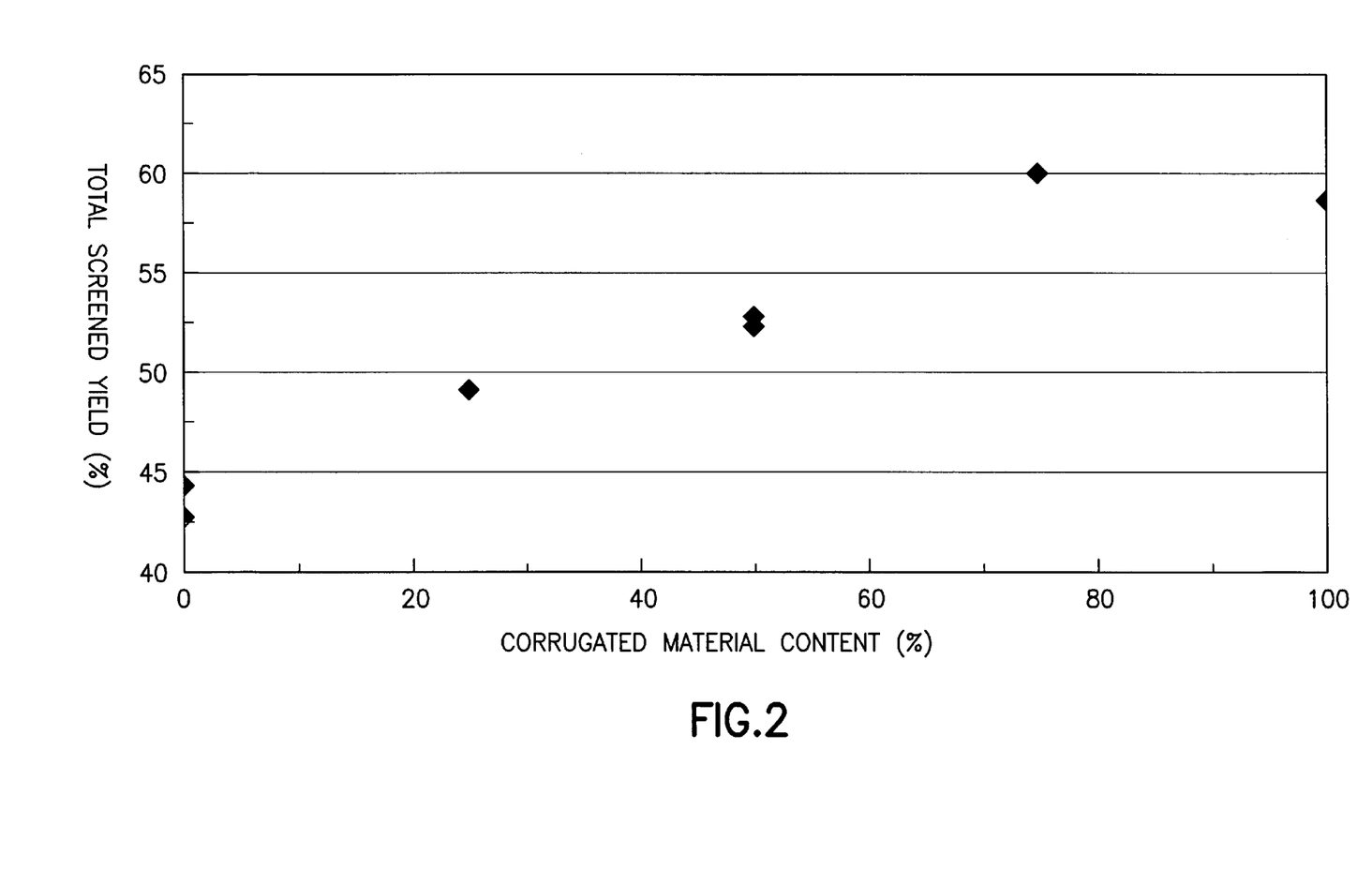
FIG. 2 is a graph of total screened yield (%) for various corrugated material contents (%) used in laboratory co-pulping of corrugated material clippings and southern hardwood.

The pulps were tested for kappa number, screened yield, percentage rejects and viscosity. The black liquor was tested for pH and residual alkali. Table 1 shows data for various ratios of corrugated material (CM), i.e., clippings, and southern hardwood (HW) chips. These results show that co-pulp has a higher yield (combined yield in Table 1) than hardwood chips alone. The efficacy of the practice of this invention is shown in FIG. 2, where the combined screened yield is shown to increase generally proportionally to the increase in the corrugated material content and achieves a maximum yield at about 25% hardwood and 75% corrugated material.

Figure 3:
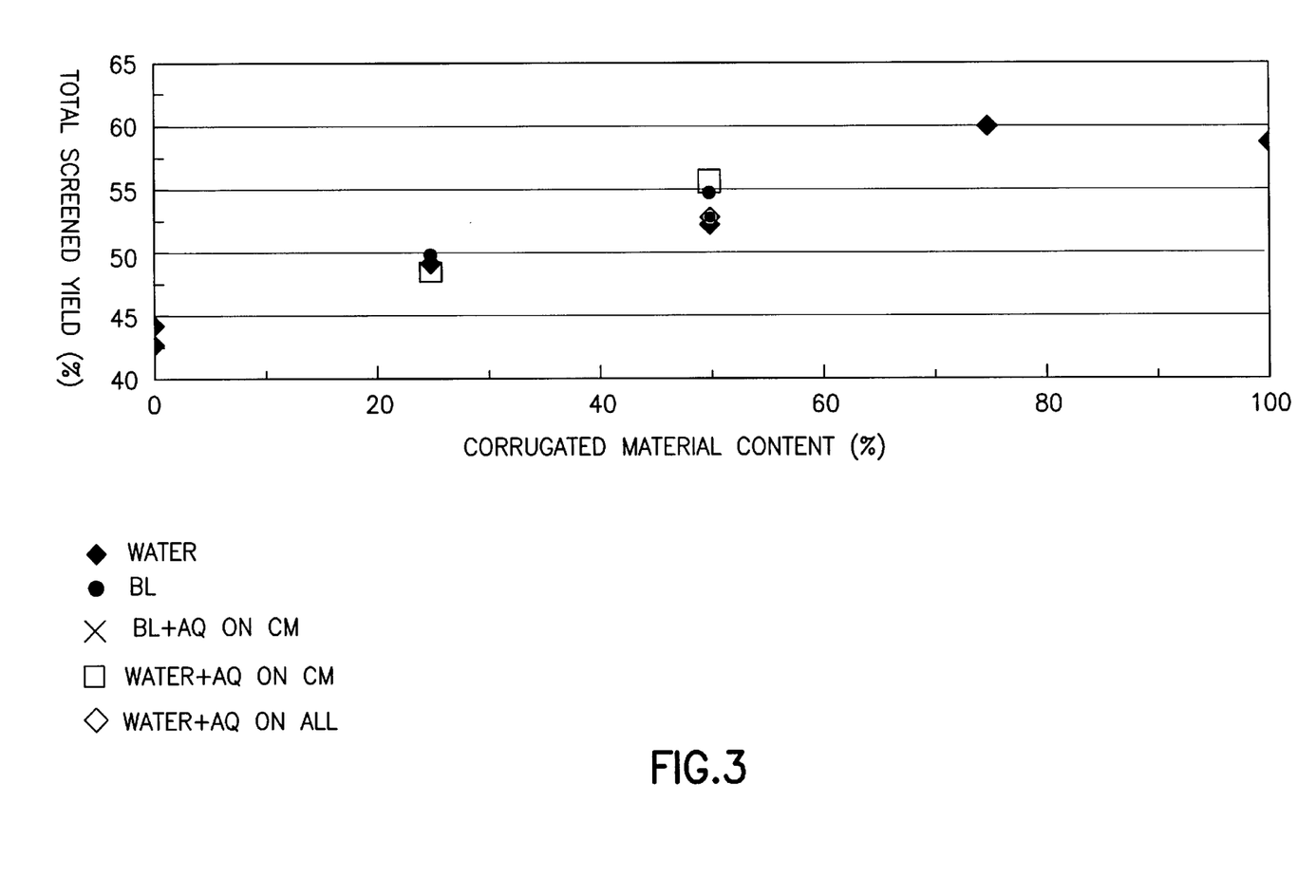
FIG. 3 is a graph of total screened yield (%) for various corrugated material contents (%) used in laboratory co-pulping of corrugated material clippings and southern hardwood with various additives or pretreatment: (♦) prewetting the corrugated material with water; (●) prewetting the corrugated material with black liquor; (x) prewetting the corrugated material with black liquor and using anthraquinone in the cook; (□) prewetting the corrugated material and the southern hardwood with water and using anthraquinone in the cook.

Laboratory Co-Pulping of Corrugated Clippings and Southern Hardwood with Additives or Pretreatments. Table 2 includes the results of further experiments performed in a laboratory digester, including prewetting of the CM with black liquor or water, with and without anthraquinone in the cook. Data for different ratios of corrugated material and hardwood chips with pretreatment or additives are shown in Table 2. FIG. 3 again shows that the combined screened yield increases generally proportional to the increase in the corrugated material content and achieves a maximum yield at about 25% hardwood chips and 75% corrugated material.

Pilot Digester Co-Pulping of Corrugated Clippings and Wood Chips. Further experiments were carried in a pilot digester. Corrugated box clippings were recooked in the digester along with wood chips to make an acceptably bright, clean and strong fiber furnish. Box factory corrugated clippings were mixed with Northern wood chips and cooked in the pilot digester. Nine pilot digester cooks were performed: four using softwood chips and four using hardwood chips. One cook recooked 100% corrugated clippings. Kraft pulping of the corrugated clippings/hardwood chips mixture was carried out at 16% active alkali on wood (as $Na_2O$). Kraft pulping of the corrugated clippings/softwood chips mixture was carried out at 20.65% active alkali on wood (except for cook #5). All of these mixtures were cooked at a temperature of 170° C. for 115 minutes. These pilot digester studies showed the following: (1) pulp from digester cooks containing corrugated clippings and hardwood chips was slightly stronger and cleaner than pulp made from 100% hardwood chip digester cooks; and (2) pulp from digester cooks containing corrugated clippings and softwood chips was slightly weaker but of comparable brightness and cleanliness levels as pulp made from 100% softwood chip digester cooks. Tables 3 and 4 list the handsheet strength results for the hardwood and softwood pilot digester cooks, respectively. The L, a and b values indicate the shade and lightness of the sample. They were measured using a Hunter L, a, b meter. The values listed for the entry "Ball Mill" refer to the amount of refining the samples received.

Figure 4:
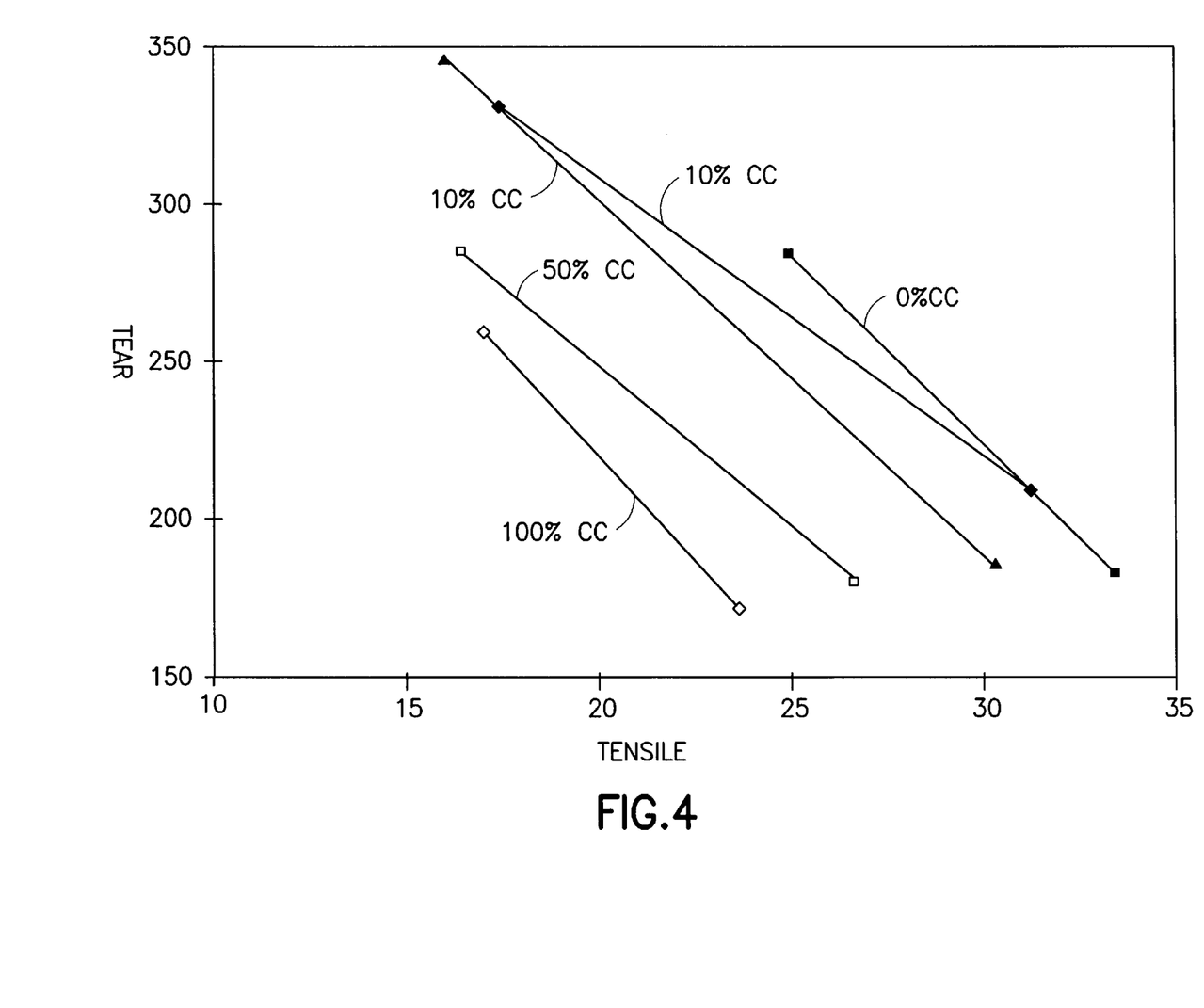
FIG. 4 is a graph showing tear strength versus tensile strength for handsheets made from a furnish containing various amounts of corrugated clippings (CC) and softwood chips.

The results of recooking corrugated clippings with softwood chips (listed in Table 3) showed that corrugated clippings required less white liquor to cook than did softwood chips, as evidenced by the lower resultant kappa number with increased percentages of corrugated clippings. The softwood chip yield was 44.5%. The yield from recooked corrugated clippings was 66.5%. Compared to pulp made from 100% softwood chips, pulp made from 90% softwood chips and 10% corrugated clippings had comparable kappa numbers, brightness, L, a, and b values, and dirt counts. Handsheet strength values were slightly lower. FIG. 4 shows that as the percentage of corrugated clippings increases, the tear strength v. tensile strength relationship for the handsheet decreases.

Figure 5:
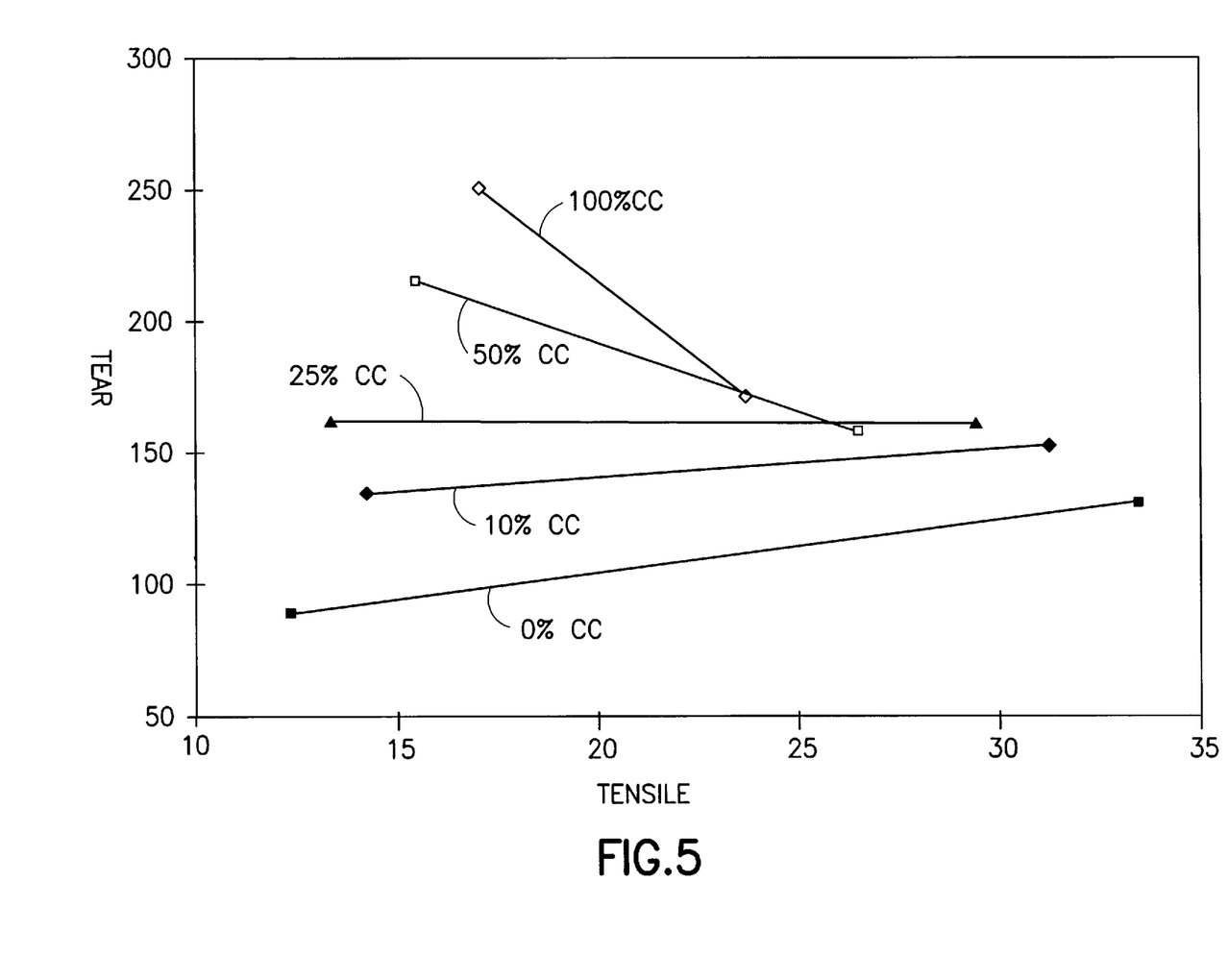
FIG. 5 is a graph showing tear strength versus tensile strength for handsheets made from a furnish containing various amounts of corrugated clippings (CC) and hardwood chips.

The results of recooking corrugated clippings with hardwood chips (listed in Table 4) showed that corrugated clippings required more white liquor to cook than did hardwood chips, as evidenced by the higher resultant kappa number with increased percentages of corrugated clippings. The hardwood chip yield was 45.1%. The yield from recooked corrugated clippings averaged 70.3%. Compared to pulp made from 100% hardwood chips, pulp made from 90% hardwood chips and 10% corrugated clippings had a slightly higher kappa number, slightly lower brightness, comparable L, a, and b values, and much less dirt. Handsheet strength improved as the percentage of corrugated clippings increased, as shown in FIG. 5.

Digester Co-Pulping of Corrugated Clippings and Softwood Chips. Two separate digester trials were conducted to investigate co-pulping of corrugated clippings and softwood chips. The first trial examined the effect of recooking one bale of corrugated clippings in a digester with softwood chips. The second trial examined the effect of recooking 3.5 bales of corrugated clippings in a digester with softwood chips. The bales of corrugated clippings were loosened by hand and then manually placed on the chip belt. The clippings were not shredded. The corrugated clippings were placed on a cross haul belt for Trial 1 and on a chip conveyor for Trial 2. The chip screens were bypassed during trial 2. Pulp samples from the blow line sampler and from the final brown stock washer (BSW) were collected, tested and compared to pulp samples collected from digester cooks that did not contain corrugated clippings. These trials showed that cooking one bale and 3.5 bales of corrugated clippings in a digester along with softwood chips had no significant impact on resultant pulp properties.

For Trial 1, the weight of the corrugated clippings was 0.75 ton/digester and the weight of the wet softwood chips was 64.75 tons/digester (est.), giving a weight percentage of 1.2 wt. % corrugated clippings in the digester. The resultant fiber included 0.44 ton/cook from the corrugated clippings and 14.46 tons/cook from the softwood chips, i.e., 3.0% corrugated clipping fiber. For Trial 2, the weight of the corrugated clippings was 2.63 tons/digester and the weight of the wet softwood chips was 62.37 tons/digester (est.), giving a weight percentage of 4 wt. % corrugated clippings in the digester. The resultant fiber included 1.54 tons/cook from the corrugated clippings and 14.04 tons/cook from the softwood chips, i.e., 9.9% corrugated clipping fiber.

Table 5 shows the results for Trial 1. Cook #7 contained one bale of corrugated clippings. Cooks #5 and #6 contained no clippings. There were no significant differences between these cooks, i.e., the kappa number, L, a and b values, dirt counts and handsheet strength properties were all similar.

Table 6 shows the results for Trial 2. Cook #6 contained 3.5 bales of corrugated clippings. Cook #7 contained no corrugated clippings. Both cooks had lower than targeted kappa numbers. Compared to each other, cook #6 and cook #7 were very similar. Cook #6, which had the clippings, had a slightly higher kappa number, slightly lower L value, and lower dirt counts. Handsheet strengths of cook #6 and cook #7 were similar. Compared to the softwood averages for Trial 1, both of cooks #6 and #7 in Trial 2 had lower kappa numbers, higher L values, lower dirt counts and lower pulp strength values. All of these differences were due to cooks #6 and #7 being overcooked.

Figure 6:
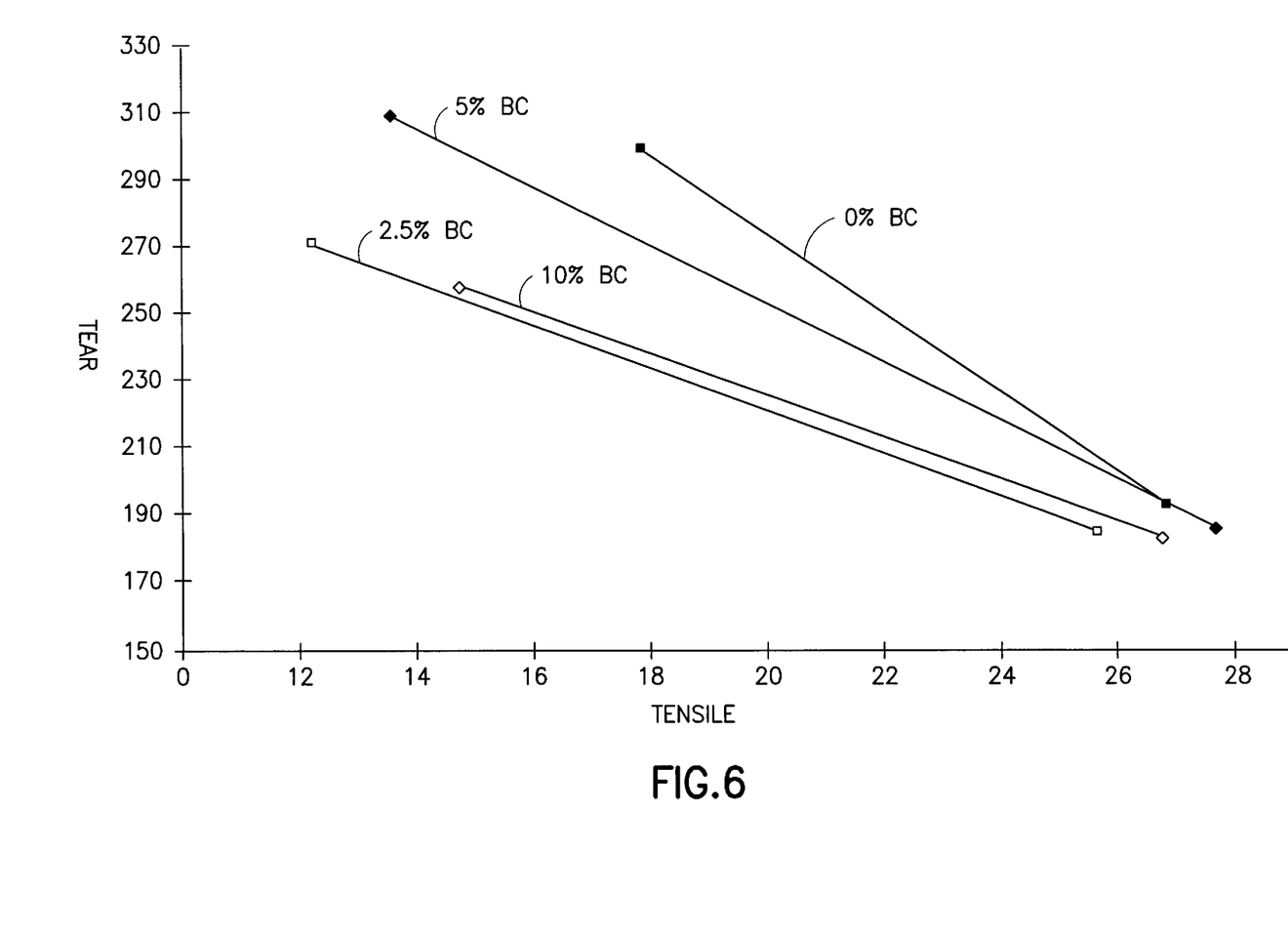
FIG. 6 is a graph showing tear strength versus tensile strength for handsheets made from a furnish containing various amounts of boxcuts (BC) and softwood chips.

Pilot Digester Co-Pulping of Boxcuts and Softwood Chips. Wood substitutes other than corrugated clippings were also co-pulped with wood chips. Boxcuts were mixed with softwood chips and the materials were recooked in a pilot digester at various weight percentages. After cooking, the pulp was evaluated for its color and strength properties. Table 7 shows the cook conditions and the pulp quality results for each of four cooks. As seen from the data in Table 7, the cooks involving boxcuts had higher kappa numbers and slightly lower rejects (% shives) than the cook with 100% softwood. The pulp from the 100% softwood furnish and the pulp from the 95% softwood/5% boxcuts furnish had comparable L, a, and b color values and 60-minute ball mill results (see FIG. 6). However, the tensile strength and fiber length were slightly higher for handsheets made of pulp from the 95% softwood/5% boxcuts furnish and the tear strength was about 3–4% lower. The boxcuts had a higher crude yield at 65%, compared to 48% for softwood chips. The handsheet strength test results suggest that the addition of one bale of boxcuts to each softwood chip cook, corresponding to a weight percentage of 1.5%, would have little or no adverse effects on the pulp quality.

Figure 7:
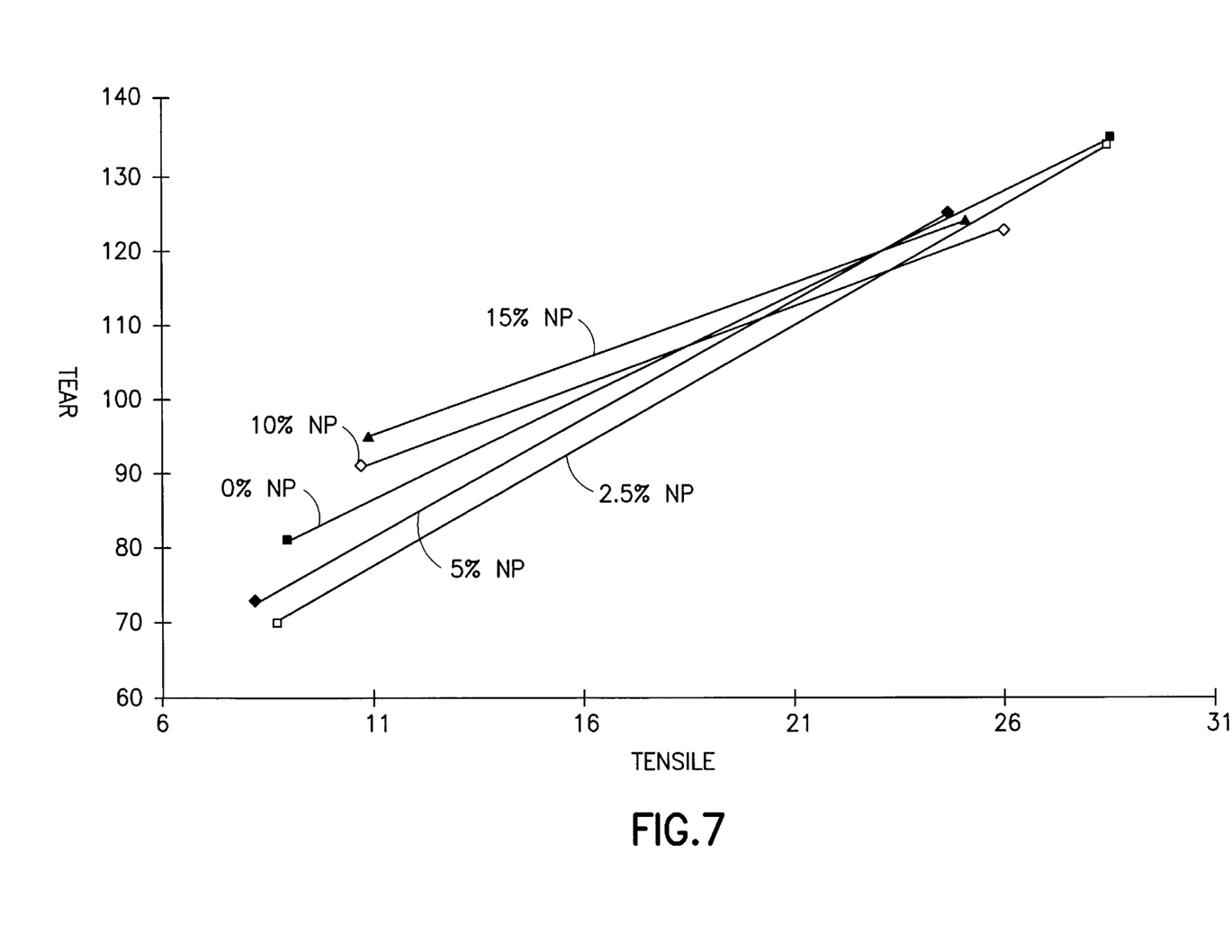
FIG. 7 is a graph showing tear strength versus tensile strength for handsheets made from a furnish containing various amounts of newsprint (NP) and hardwood chips.

Pilot Digester Co-Pulping of Newsprint and Hardwood Chips. In other trial cooks, newsprint was mixed with hardwood chips and the materials were recooked in a pilot digester at various weight percentages. After cooking, the pulp was evaluated for its color and strength properties. Table 8 shows the cook conditions and the pulp quality results for each of six cooks. As seen from the data in Table 8, the cooks involving newsprint had higher kappa numbers and considerably lower rejects than the cook with 100% hardwood. Excluding the 100% newsprint trial, all of the newsprint cooks had lower tensile and tear (0-min. ball mill) strengths than the 100% hardwood cook (see FIG. 7). This arises from the shorter fiber lengths in the newsprint cooks (Kajaani). The L and b color values and the brightness were higher for the newsprint cooks than for the 100% hardwood values. All of the handsheet strength results for the 2.5% newsprint cook are comparable to the values for the 100% hardwood cook. The yields for the newsprint trials were the same as those for the boxcuts trials (newsprint—65%; hardwood—48%). The handsheet strength test results suggest that the addition of one bale of newsprint to each hardwood chip cook, corresponding to a weight percentage of 1.5%, would have little or no adverse effects on the pulp quality.

Co-Pulping of Wax-Coated Corrugated Material and Softwood Chips. In accordance with a further aspect of the present invention, the waste cellulosic material to be co-pulped may be wax-coated material, e.g., wax-coated corrugated clippings. When wax-coated corrugated clippings are co-pulped with wood chips (e.g., softwood chips) in a digester, the fat of the wax will be dissolved by turpenes in the black liquor, by pitch dispersant and by defoamer. The wax will also be broken down by heat and sodium hydroxide in the digester. In accordance with the method of the present invention, the wax is washed out in the brown stock washers utilizing a wax dispersant, which is added to the brown stock washers. Alternatively, wax dispersant can be added to the digester or the clippings can be pre-treated with wax dispersant before the clippings are fed to the digester. The wax dispersant used will depend on the specific wax impregnating the clippings.

In accordance with one preferred method, bales of wax-coated corrugated clippings are shredded in both a low-speed shredder and a high-speed shredder. The shredded clippings are then sent to a cuber to be densified. These pellets are then added to the softwood chip pile. The pellets and softwood chips follow the normal path to the digester. The digester parameters will be the same as those for a typical softwood cook. However, the temperatures of the brown stock washers, the screen room and the wet lap machine are increased to keep the wax in a liquified form. All the pulp is wet lapped, i.e., made into large thick folded sheets or rolls still containing a large amount of moisture. The pulp usually contains from 35 to 55% by weight of air dry pulp.

The preferred embodiments of the invention have been disclosed for the purpose of illustration. Variations and modifications of the disclosed preferred embodiments which fall within the concept of this invention will be readily apparent to persons skilled in the art of pulp manufacturing. All such variations and modifications are intended to be encompassed by the claims set forth hereinafter.

TABLE 1

Results of Laboratory Co-Pulping of Corrugated Material (CM) Clippings and Southern Hardwood (HW)

| % HW | % CM | % HW Screened Yield | % CM Screened Yield | % Total Combined Screened Yield | HW Viscosity (cP) | CM Viscosity (cP) | Combined Viscosity (cP) | HW Kappa Number | CM Kappa Number | Combined Kappa Number | Black Liquor Residual Effective Alkali (g Na₂O/liter) | % Total Combined Rejects |
|---|---|---|---|---|---|---|---|---|---|---|---|---|
| 100 | 0 | 42.8 | — | 42.8 | 50.6 | — | 50.6 | 16 | — | 16 | 8.4 | 0.09 |
| 100 | 0 | 44.4 | — | 44.4 | 59.9 | — | 59.9 | 16.1 | — | 16.1 | 13 | 0.18 |
| 75 | 25 | 43.1 | 67.1 | 49.1 | 44.5 | 14.4 | 33.3 | 14.9 | 23.6 | 17.4 | 9.9 | 0.11 |
| 50 | 50 | 40.8 | 63.8 | 52.3 | 37.8 | 13.9 | 18.7 | 13.1 | 19.1 | 16.6 | 13 | 0.08 |
| 50 | 50 | 40.1 | 65.2 | 52.7 | 38.2 | 13 | 26.1 | 13.1 | 20.2 | 17.5 | 12.4 | 0.01 |
| 25 | 75 | 39.3 | 66.7 | 59.9 | 31.5 | 11.3 | 12.1 | 12.8 | 17.2 | 16.4 | 7.1 | 0.04 |
| 0 | 100 | — | 58.7 | 58.7 | — | 6.9 | 6.9 | — | 15.6 | 15.6 | 11.5 | 0.02 |

TABLE 2

Laboratory Co-Pulping of CM and Southern HW With Additives or Pretreatment

| % HW | % CM | % HW Screened Yield | % CM Screened Yield | % Total Combined Screened Yield | HW Viscosity (cP) | CM Viscosity (cP) | Combined Viscosity (cP) | HW Kappa Number | CM Kappa Number | Combined Kappa Number | Black Liquor Residual Effective Alkali (g Na₂O/liter) | % Total Combined Rejects |
|---|---|---|---|---|---|---|---|---|---|---|---|---|
| 50 | 50 Presoaked with Black Liquor | 40.6 | 64.7 | 52.7 | 37.4 | 11.9 | 17.2 | 12.8 | 17.3 | 14.3 | 11.2 | 0.03 |
| 50 | 50 Presoaked with Black Liquor | 41.6 | 67.8 | 54.7 | 26 | 8 | 12.5 | 12.4 | 17.3 | 15.8 | 14.3 | 0.03 |
| 50 | 50 Presoaked with Black Liquor and 0.05% Anthraquinone (on o.d. CM) | 41.8 | 65.3 | 53.5 | 36.1 | 9.2 | 15.8 | 13.1 | 18.2 | 15.7 | 11.2 | 0.13 |
| 50 | 50 Presoaked with Water and 0.05% Anthraquinone (on o.d. CM) | 42.7 | 68.4 | 55.5 | 38.8 | 11 | 17.4 | 13.6 | 18 | 16.9 | 10.9 | 0.25 |
| 75 | 25 Presoaked with Black Liquor | 43.4 | 68.9 | 49.7 | 47 | 12 | 30.4 | 15.4 | 23.2 | 17.7 | 9.9 | 0.18 |
| 75 | 25 Presoaked with Water and 0.05% Anthraquinone (based on o.d. CM) | 43 | 65 | 48.5 | 44.5 | 13.2 | 29.3 | 14.5 | 23.9 | 17.3 | 9.3 | 0.11 |
| 75 | 25 Presoaked with Water and 0.05% | 42.1 | 69.4 | 48.9 | 44.6 | 12.4 | 28.4 | 14.3 | 22.5 | 16.9 | 17.1 | 0.2 |

TABLE 2-continued

Laboratory Co-Pulping of CM and Southern HW With Additives or Pretreatment

| % HW | % CM | % HW Screened Yield | % CM Screened Yield | % Total Combined Screened Yield | HW Viscosity (cP) | CM Viscosity (cP) | Combined Viscosity (cP) | HW Kappa Number | CM Kappa Number | Combined Kappa Number | Black Liquor Residual Effective Alkali (g Na₂O/liter) | % Total Combined Rejects |
|---|---|---|---|---|---|---|---|---|---|---|---|---|
| Anthraquinone (based on o.d. CM and wood chips) | | | | | | | | | | | | |

TABLE 3

| COOK No. | #4 | #1 | #2 | #3 | #5 |
|---|---|---|---|---|---|
| WT % SOFTWOOD CHIPS | 100% | 90% | 90% | 50% | 0% |
| WT % BOX CLIPPINGS | 0% | 10% | 10% | 50% | 100% |
| SW RECOOKING RESULTS | | | | | |
| K No. | 28.2 | 28.3 | 26.4 | 17.2 | 16.8 |
| TOTAL YIELD, % | 44.5 | 49.6 | 49.45 | 55.2 | 67 |
| CLIPPING YIELD, % (ASSUMING A 44.5% WOOD YIELD) | — | 95.5 | 94 | 65.9 | 67 |
| BRIGHTNESS | 25.6 | 25.5 | 24.5 | 27.2 | 26.4 |
| L value | 60.16 | 59.98 | 59.92 | 61.35 | 60.77 |
| a value | 5.25 | 5.08 | 5.31 | 4.61 | 4.58 |
| b value | 12.8 | 12.98 | 12.83 | 12.28 | 12.04 |
| IA DIRT, PPM | 208 | 423 | 319 | 209 | 205 |
| THIL DIRT | 781 | 550 | 852 | 332 | 171 |
| SW HANDSHEET STRENGTH RESULTS | | | | | |
| BALL MILL, MIN. | 0 | 0 | 0 | 0 | 0 |
| FREENESS | 855 | 860 | 860 | 840 | 805 |
| TENSILE | 24.5 | 17 | 15.6 | 16 | 16.7 |
| MULLEN | 121 | 80 | 74 | 74 | 63 |
| TEAR | 273 | 315 | 329 | 274 | 250 |
| DENSITY | 5.8 | 5.1 | 5.1 | 5.5 | 5.8 |
| POROSITY | 0 | 0 | 0 | 0 | 0 |
| FIBER LENGTH | 2.18 | 2.22 | 2.22 | 2 | 1.68 |
| BALL MILL, MIN. | 60 | 60 | 60 | 60 | 60 |
| FREENESS | 750 | 745 | 750 | 650 | 555 |
| TENSILE | 33.4 | 31.1 | 30.1 | 26.5 | 23.4 |
| MULLEN | 166 | 147 | 148 | 127 | 109 |
| TEAR | 180 | 204 | 183 | 178 | 170 |
| DENSITY | 8.9 | 8.4 | 8.6 | 8.5 | 8.5 |
| POROSITY | 17 | 11 | 14 | 38 | 59 |
| FIBER LENGTH | 2.03 | 2.01 | 1.96 | 1.79 | 1.49 |
| SW RECOOKING CONDITIONS | | | | | |
| ACTIVE ALKALI, % | 20.65% | 20.65% | 20.65% | 20.65% | 17.00% |
| COOK TEMP, F. | 342 | 342 | 342 | 342 | 342 |
| CYCLE TIME, MIN | 115 | 115 | 115 | 115 | 115 |

TABLE 4

| | | | | |
|---|---|---|---|---|
| WT % HARDWOOD CHIPS | 100% | 90% | 75% | 50% |
| WT % BOX CLIPPINGS | 0% | 10% | 25% | 50% |
| HW RECOOKING RESULTS | | | | |
| K No. | 11.8 | 13.3 | 16.8 | 15.1 |
| TOTAL YIELD, % | 45.1 | 52.2 | 49.1 | 62.3 |
| CLIPPING YIELD, % (ASSUMING A 45.1% HW WOOD YIELD) | — | 116.1 | 61.1 | 79.5 |
| BRIGHTNESS | 30.3 | 28.6 | 27.3 | 27.3 |
| L value | 61.92 | 60.69 | 59.6 | 60.5 |
| a value | 3.76 | 3.9 | 4.69 | 4.3 |
| b value | 9.55 | 10.03 | 10.05 | 11.5 |
| IA DIRT, PPM | 1943 | 783 | 559 | 188 |
| THIL DIRT | 253 | 165 | 117 | 27 |
| HW HANDSHEET STRENGTH RESULTS | | | | |
| BALL MILL, MIN. | 0 | 0 | 0 | 0 |
| FREENESS | 820 | 800 | 820 | 800 |
| TENSILE | 12.2 | 14 | 13.2 | 15.1 |

TABLE 4-continued

| WT % HARDWOOD CHIPS | 100% | 90% | 75% | 50% |
|---|---|---|---|---|
| WT % BOX CLIPPINGS | 0% | 10% | 25% | 50% |
| MULLEN | 33 | 45 | 46 | 57 |
| TEAR | 89 | 135 | 162 | 216 |
| DENSITY | 5.3 | 5.7 | 5.4 | 5.6 |
| POROSITY | 0 | 0 | 0 | 0 |
| FIBER LENGTH | 0.72 | 0.73 | 0.75 | 0.79 |
| BALL MILL, MIN. | 60 | 60 | 60 | 60 |
| FREENESS | 625 | 630 | 600 | 530 |
| TENSILE | 33.4 | 31.1 | 29.3 | 26.3 |
| MULLEN | 153 | 143 | 132 | 118 |
| TEAR | 131 | 152 | 160 | 157 |
| DENSITY | 9.8 | 9.6 | 9 | 8.9 |
| POROSITY | 49 | 42 | 45 | 62 |
| FIBER LENGTH | 0.64 | 0.67 | 0.71 | 0.75 |
| HW RECOOKING CONDITIONS | | | | |
| ACTIVE ALKALI, % | 16.00% | 16.00% | 16.00% | 16.00% |
| COOK TEMP, F. | 344 | 344 | 344 | 344 |
| CYCLE TIME, MIN | 115 | 115 | 115 | 115 |

TABLE 5

Trial Results from Recooking 1 Bale Corrugated Clipping with Softwood Chips

| Cook No. | #5 | | #6 | | #7 | |
|---|---|---|---|---|---|---|
| Digester No. | 3 | | 2 | | 1 | |
| Bales Corrugated Clippings | 0 | | 0 | | 1 | |
| % Active Alkali | 16.6 | | 16.6 | | 16.6 | |
| Top Temperature | 340 | | 343 | | 340 | |
| H-Factor | 1000 | | 1000 | | 1000 | |
| Species | SW | | SW | | SW | |
|  | Digester | BSW | Digester | BSW | Digester | BSW |
| K Number | 25.0 | 22.1 | 25.6 | 22.6 | 26.1 | 22.9 |
| L Value | 59.26 | 61.8 | 59.49 | 61.47 | 59.20 | 61.30 |
| a value | 4.88 | 4.69 | 4.92 | 4.67 | 5.02 | 4.75 |
| b value | 12.40 | 13.90 | 12.52 | 13.07 | 12.31 | 13.24 |
| Brightness | 24.2 | 26.4 | 24.4 | 25.8 | 24.5 | 25.5 |
| Dirt Image Analysis | | | | | | |
| Speck Count | 83 | 131 | 80 | 143 | 86 | 86 |
| TAPPI, ppm Thilmany | 132 | 276 | 134 | 264 | 102 | 129 |
| Count | 29 | 37 | 32 | 33 | — | 37 |
| TAPPI, ppm | 310 | 714 | 333 | 530 | — | 411 |
| % Hardwood | 0% | 0% | 1% | 1% | 2% | 1% |
| Refining, minutes | 0 | 0 | 0 | 0 | 0 | 0 |
| Freeness | 845 | 850 | 850 | 855 | 850 | 850 |
| Tensile | 17.7 | 14.5 | 17.2 | 15.5 | 13.5 | 14.4 |
| Mullen | 72 | 93 | 73 | 75 | 63 | 65 |
| Tear | 270 | 271 | 253 | 253 | 286 | 291 |
| Density | 5.3 | 5.0 | 5.1 | 5.0 | 4.8 | 5.0 |
| Porosity | 0 | 0 | 0 | 0 | 0 | 0 |
| Fiber Length | 2.20 | 2.24 | 2.21 | 2.22 | 2.23 | 2.17 |
| Refining, minutes | 60 | 60 | 60 | 60 | 60 | 60 |
| Freeness | 670 | 735 | 700 | 750 | 680 | 720 |
| Tensile | 30.6 | 30.5 | 28.9 | 29.3 | 28.2 | 29.0 |
| Mullen | 135 | 149 | 142 | 148 | 133 | 142 |
| Tear | 162 | 186 | 153 | 169 | 171 | 177 |
| Density | 9.3 | 8.8 | 9.3 | 8.9 | 9.0 | 8.9 |
| Porosity | 82 | 23 | 50 | 18 | 50 | 29 |
| Fiber Length | 1.90 | 1.99 | 1.95 | 2.00 | 1.92 | 1.91 |

TABLE 6

Trial Results from Recooking 3.5 Bale Corrugated Clipping with Softwood Chips

| Cook No. | #5 | | #6 | | February | |
|---|---|---|---|---|---|---|
| Digester No. | 4 | | 3 | | Average | |
| Bales Corrugated Clippings | 3.5 | | 0 | | 0 | |
| % Active Alkali | 16.3 | | 16.2 | | 16.7 | |
| Top Temperature | 344 | | 343 | | — | |
| H-Factor | 1000 | | 1000 | | 1000 | |
| Species | Softwood | | Softwood | | Softwood | |
|  | Digester | BSW | Digester | BSW | Digester | BSW |
| K Number | 20.5 | 17.2 | 17.4 | 147 | 23.7 | — |
| L Value | 60.17 | 63.60 | 61.29 | 64.45 | — | 61.16 |
| a value | 4.67 | 4.31 | 4.53 | 4.05 | — | — |
| b value | 12.69 | 13.17 | 11.96 | 12.65 | — | — |
| Brightness | 25.6 | 28.3 | 27.0 | 29.9 | — | — |
| Dirt Image Analysis | | | | | | |
| Speck Count | 64 | 62 | 120 | 102 | — | — |
| TAPPI, ppm Thilmany | 393 | 226 | 196 | 321 | — | — |
| Count | 16 | 12 | 21 | 20 | — | 38 |
| TAPPI, ppm | 179 | 111 | 299 | 191 | — | 417 |
| % Hardwood | 3% | 3 | 1% | 1% | — | — |
| Refining, minutes | 0 | 0 | 0 | 0 | 0 | 0 |
| Freeness | 835 | 835 | 850 | 855 | — | — |
| Tensile | 16.4 | 13.5 | 14.6 | 13.3 | — | — |
| Mullen | 72 | 60 | 69 | 59 | — | — |
| Tear | 269 | 295 | 259 | 295 | — | — |
| Density | 5.2 | 5.4 | 5.2 | 5.3 | — | — |
| Porosity | 0 | 0 | 0 | 0 | — | — |
| Fiber Length | 2.04 | 2.06 | 2.11 | 2.02 | — | — |
| Refining, minutes | 60 | 60 | 60 | 60 | 60 | 60 |
| Freeness | 680 | 700 | 635 | 690 | — | 700 |
| Tensile | 24.6 | 24.3 | 26.9 | 25.7 | — | 29.4 |
| Mullen | 118 | 126 | 123 | 122 | — | 134 |
| Tear | 183 | 196 | 160 | 190 | — | 181 |
| Density | 8.8 | 8.9 | 9.2 | 9.1 | — | — |
| Porosity | 27 | 43 | 79 | 38 | — | 46 |
| Fiber Length | 1.78 | 1.86 | 1.65 | 1.78 | — | |

TABLE 7

RESULTS FROM BOXCUT/SWD TRIAL COOKS

| OD WT % SWD | 100% | 97.5% | 95% | 90% |
|---|---|---|---|---|
| OD WT % BC | 0% | 2.5% | 5% | 10% |
| ACTIVE ALKALI % | 21% | 21% | 21% | 21% |
| TOP TEMP, F. | 342 | 342 | 342 | 342 |
| COOK TIME, MIN | 115 | 115 | 115 | 115 |
| K No. | 21.9 | 29.8 | 24 | 23.9 |
| CRUDE YIELD % | 47.21% | 56.69% | 51.79% | 50.85% |
| % SHIVES | 9.69% | 6.23% | 6.66% | 6.38% |
| HANDSHEET PROPERTIES BALL MILL, 0 MINUTES | | | | |
| FREENESS | 830 | 860 | 840 | 850 |
| TENSILE | 18.1 | 12.4 | 13.8 | 14.9 |
| MULLEN | 80 | 53 | 63 | 66 |
| TEAR | 301 | 273 | 311 | 260 |
| DENSITY | 5.9 | 4.6 | 4.6 | 5.2 |
| POROSITY | 0 | 0 | 0 | 0 |
| KAJAANI | 2.08 | 2.39 | 2.16 | 2.24 |

TABLE 7-continued

RESULTS FROM BOXCUT/SWD TRIAL COOKS

| OD WT % SWD | 100% | 97.5% | 95% | 90% |
|---|---|---|---|---|
| OD WT % BC | 0% | 2.5% | 5% | 10% |
| BALL MILL, 60 MINUTES | | | | |
| FREENESS | 765 | 740 | 750 | 750 |
| TENSILE | 26.9 | 25.7 | 27.7 | 26.8 |
| MULLEN | 135 | 122 | 141 | 128 |
| TEAR | 194 | 186 | 187 | 184 |
| DENSITY | 8.7 | 8.5 | 9.2 | 9.1 |
| POROSITY | 21 | 9 | 22 | 38 |
| KAJAANI | 1.85 | 2.04 | 1.9 | 1.92 |
| COLOR | | | | |
| L VALUE | 61.5 | 58.12 | 62.7 | 63.73 |
| A VALUE | 4.8 | 5.14 | 4.43 | 4.51 |
| B VALUE | 12.33 | 14.81 | 13.77 | 13.56 |
| BRIGHTNESS | 27.2 | 21.3 | 27.7 | 28.4 |

TABLE 8

| OD WT % HDWD | 100% | 97.5% | 95% | 90% | 85% | 0% |
|---|---|---|---|---|---|---|
| OD WT % NP | 0% | 2.5% | 5% | 10% | 15% | 100% |
| RESULTS FROM NEWSPRINT/HDWD TRIAL COOKS | | | | | | |
| ACTIVE ALKALI % | 18% | 18% | 18% | 18% | 18% | 18% |
| TOP TEMP, F. | 12.6 | 342 | 342 | 342 | 342 | 342 |
| COOK TIME, MIN | 115 | 115 | 115 | 115 | 115 | 115 |
| K No. | 12.6 | 13.5 | 13.1 | 13.3 | 13.9 | 17 |
| CRUDE YIELD % | 48.63% | 47.85% | 50.02% | 49.96% | 51% | NA |
| % SHIVES | 6.41% | 5.03% | 1.93% | 1.4% | 5.4% | 0% |
| HANDSHEET PROPERTIES | | | | | | |
| BALL MILL, 0 MINUTES | | | | | | |
| FREENESS | 845 | 820 | 830 | 820 | 800 | 200 |
| TENSILE | 9 | 8.7 | 8.2 | 10.8 | 11 | 19.8 |
| MULLEN | 25 | 25 | 23 | 28 | 30 | 76 |
| TEAR | 81 | 70 | 73 | 91 | 95 | 181 |
| DENSITY | 5.2 | 5.3 | 5.1 | 5.2 | 5.6 | 8.3 |
| POROSITY | 0 | 0 | 0 | 0 | 0 | 122 |
| KAJAANI | 0.87 | 0.66 | 0.75 | 0.71 | 0.67 | 1.43 |
| BALL MILL, 60 MINUTES | | | | | | |
| FREENESS | 645 | 660 | 670 | 565 | 560 | 190 |
| TENSILE | 28.8 | 28.7 | 24.9 | 26.2 | 25.3 | 19.9 |
| MULLEN | 125 | 112 | 102 | 107 | 107 | 76 |
| TEAR | 135 | 134 | 125 | 123 | 124 | 107 |
| DENSITY | 9.5 | 9.5 | 9.7 | 9.3 | 9.3 | 10.1 |
| POROSITY | 35 | 19 | 17 | 28 | 46 | 1133 |
| KAJAANI | 0.74 | 0.57 | 0.62 | 0.61 | 0.58 | 1.2 |
| COLOR | | | | | | |
| L VALUE | 61.08 | 67.74 | 65.18 | 66.44 | 66.07 | 54.96 |
| A VALUE | 4.47 | 3.27 | 3.83 | 3.72 | 3.83 | 2.77 |
| B VALUE | 10.44 | 11.46 | 10.99 | 11.06 | 10.74 | 9.36 |
| BRIGHTNESS | 28.6 | 34.5 | 31.3 | 33.5 | 34.2 | 23.2 |

We claim:

1. A method for producing pulp, comprising the steps of:
   feeding waste paper/paperboard products made of cellulosic material in non-pulp form, wood chips and cooking solution into a digester;
   cooking the waste paper/paperboard products and wood chips in said cooking solution at a temperature and a pressure and for a duration so that both the waste paper/paperboard products and the wood chips are substantially pulped;
   discharging the cooking solution and pulp from said digester; and
   washing the cooking solution from the pulp using water.

2. The method as defined in claim 1, further comprising the step of shredding said waste paper/paperboard products before said paper/paperboard products are input into the digester.

3. The method as defined in claim 1, wherein said waste paper/paperboard products comprise corrugated material.

4. The method as defined in claim 1, wherein said waste paper/paperboard products comprise boxcuts.

5. The method as defined in claim 1, wherein said waste paper/paperboard product comprise newsprint.

6. The method as defined in claim 1, wherein said wood chips comprise softwood chips.

7. The method as defined in claim 1, wherein said wood chips comprise hardwood chips.

8. The method as defined in claim 1, wherein said wood chips comprise hardwood chips.

9. A method for producing pulp, comprising the steps of:
   feeding waste coated paper/paperboard products made of cellulosic material in non-pulp form, wood chips and cooking solution into a digester;
   cooking the coated waste paper/paperboard products and wood chips in said cooking solution at a temperature and a pressure and for a duration so that the coating material separates from the waste paper/paperboard products and both the waste paper/paperboard products and the wood chips are substantially pulped;
   discharging the coating material, cooking solution and pulp from said digester; and
   washing the coating material and cooking solution from the pulp.

10. The method as defined in claim 9, further comprising the step of exposing the coated waste paper/paperboard products to a dispersant which disperses the coating material under the cooking conditions.

11. The method as defined in claim 10, wherein said coated waste paper/paperboard products comprise wax-coated corrugated material and said dispersant is a wax dispersant.

12. The method as defined in claim 10, wherein said dispersant is fed to the digester.

13. The method as defined in claim 10, wherein said dispersant is added during said washing step.

14. The method as defined in claim 10, wherein said coated waste paper/paperboard products are treated with said dispersant before said coated waste paper/paperboard products are added to the digester.

15. The method as defined in claim 10, wherein said wood chips comprise softwood chips.

16. The method as defined in claim 9, wherein said coated waste paper/paperboard products comprise wax-coated corrugated material.

* * * * *